US011195176B2

(12) United States Patent
Banks Larsen et al.

(10) Patent No.: US 11,195,176 B2
(45) Date of Patent: Dec. 7, 2021

(54) SYSTEM, METHOD, AND COMPUTER PROGRAM PRODUCT FOR STAND-IN PROCESSING

(71) Applicant: Visa International Service Association, San Francisco, CA (US)

(72) Inventors: Michele Lauren Banks Larsen, Ellicott City, MD (US); David Stephen Richey, Hayward, CA (US)

(73) Assignee: Visa International Service Association, San Francisco, CA (US)

(*) Notice: Subject to any disclaimer, the term of this patent is extended or adjusted under 35 U.S.C. 154(b) by 133 days.

(21) Appl. No.: 16/058,331

(22) Filed: Aug. 8, 2018

(65) Prior Publication Data

US 2019/0066105 A1    Feb. 28, 2019

Related U.S. Application Data

(60) Provisional application No. 62/549,023, filed on Aug. 23, 2017.

(51) Int. Cl.
    *G06Q 20/40*    (2012.01)
    *G06Q 20/10*    (2012.01)
    *G06Q 20/22*    (2012.01)

(52) U.S. Cl.
CPC .......... *G06Q 20/40* (2013.01); *G06Q 20/102* (2013.01); *G06Q 20/227* (2013.01); *G06Q 20/229* (2020.05)

(58) Field of Classification Search
CPC .. G06Q 20/20; G06Q 20/3223; G06Q 20/382; G06Q 20/40; G06Q 20/40145; G06Q 50/01; G06Q 20/102; H04L 2463/102; H04W 12/06

USPC ......................................................... 705/40
See application file for complete search history.

(56) References Cited

U.S. PATENT DOCUMENTS

| | | | | |
|---|---|---|---|---|
| 5,999,625 A * | 12/1999 | Bellare | ................. | G06Q 20/06 705/39 |
| 6,138,143 A * | 10/2000 | Gigliotti | ............. | G06F 16/2379 709/203 |
| 6,154,847 A * | 11/2000 | Schofield | ............ | G06F 11/1471 714/20 |
| 10,002,348 B1 * | 6/2018 | Doctor | ................. | G06Q 20/401 |
| 10,432,667 B2 * | 10/2019 | Hubbard | ................. | H04L 63/20 |

(Continued)

*Primary Examiner* — Scott S Trotter
*Assistant Examiner* — Slade E Smith
(74) *Attorney, Agent, or Firm* — The Webb Law Firm (57) ABSTRACT

Provided is a computer-implemented method, system, and computer program product for stand-in processing. The method includes receiving a transaction request message corresponding to a transaction, the transaction request message including a transaction value and an account identifier, determining whether to process the transaction request message as a stand-in transaction based at least partially on the transaction request message, in response to determining to process the transaction request message as a stand-in transaction, determining an account capacity corresponding to the account identifier, determining whether to authorize the stand-in transaction based at least partially on the transaction value and the account capacity, and in response to determining to authorize the stand-in transaction, completing the stand-in transaction. A system and computer program product are also disclosed.

16 Claims, 4 Drawing Sheets

(56) References Cited

U.S. PATENT DOCUMENTS

| | | | |
|---|---|---|---|
| 2006/0131385 A1* | 6/2006 | Kim | G06Q 20/40 235/379 |
| 2011/0270757 A1* | 11/2011 | Hammad | G06Q 30/06 705/44 |
| 2012/0036073 A1* | 2/2012 | Basu | G06Q 20/42 705/44 |
| 2012/0296824 A1* | 11/2012 | Rosano | G06Q 20/102 705/44 |
| 2013/0024289 A1* | 1/2013 | Cueli | G06Q 30/00 705/14.65 |
| 2013/0179281 A1* | 7/2013 | White | G06Q 20/20 705/21 |
| 2013/0246274 A1* | 9/2013 | Marcous | G06Q 20/385 705/44 |
| 2014/0032409 A1* | 1/2014 | Rosano | G06Q 20/409 705/44 |
| 2014/0052586 A1* | 2/2014 | Weber | G06Q 30/06 705/26.82 |
| 2014/0074724 A1* | 3/2014 | Gordon | G06Q 20/023 705/71 |
| 2014/0108249 A1* | 4/2014 | Kulpati | G06Q 20/16 705/44 |
| 2014/0164243 A1* | 6/2014 | Aabye | G06Q 20/3821 705/44 |
| 2014/0304158 A1* | 10/2014 | Basu | G06Q 20/34 705/44 |
| 2014/0344155 A1* | 11/2014 | Liu | G06Q 20/322 705/44 |
| 2015/0220890 A1* | 8/2015 | Seshadri | G06Q 20/409 705/44 |
| 2015/0262166 A1* | 9/2015 | Singh | G06Q 20/3672 705/44 |
| 2015/0356562 A1* | 12/2015 | Siddens | G06Q 20/4016 705/44 |
| 2016/0125405 A1* | 5/2016 | Alterman | G06Q 20/42 705/44 |
| 2017/0053286 A1* | 2/2017 | Bhagat | H04W 12/06 |
| 2017/0293930 A1* | 10/2017 | Clark | G06Q 30/0207 |
| 2017/0293931 A1* | 10/2017 | Clark | G06Q 20/3224 |
| 2017/0295155 A1* | 10/2017 | Wong | H04L 67/306 |
| 2017/0357977 A1* | 12/2017 | Pitz | G06Q 20/32 |
| 2018/0039966 A1* | 2/2018 | Gill | G06Q 20/36 |
| 2018/0232720 A1* | 8/2018 | Robeen | G06Q 20/227 |
| 2018/0268405 A1* | 9/2018 | Lopez | G06Q 20/385 |
| 2018/0322489 A1* | 11/2018 | Altenhofen | G06Q 20/065 |
| 2018/0330371 A1* | 11/2018 | Tadiparti | G06Q 20/38215 |
| 2019/0020478 A1* | 1/2019 | Girish | H04L 63/083 |

* cited by examiner

SYSTEM, METHOD, AND COMPUTER PROGRAM PRODUCT FOR STAND-IN PROCESSING

CROSS REFERENCE TO RELATED APPLICATION

This application claims priority to U.S. Provisional Patent Application No. 62/549,023, filed Aug. 23, 2017, entitled "SYSTEM, METHOD, AND COMPUTER PROGRAM PRODUCT FOR STAND-IN PROCESSING," the entire disclosure of which is herein incorporated by reference.

BACKGROUND OF THE INVENTION

Field of the Invention

This invention relates generally to transaction processing and, in one particular embodiment, to a system, method, and computer program product for stand-in processing.

Technical Considerations

Transaction service providers sometimes process transaction authorization requests on behalf of an issuer institution if certain conditions are met. For example, a transaction service provider may provide such stand-in processing for the issuer institution if an issuer system associated with the issuer institution is unavailable for communication or if the issuer institution has designated the transaction service provider to process transaction authorization requests for certain types of transactions.

Stand-in processing provides issuer institutions with business continuity during maintenance or unplanned outages of issuer systems. However, such stand-in processing may provide risks for both the issuer institution and the transaction service provider. For example, issuer institutions and transaction service providers may wish to avoid processing transactions for accounts that are delinquent or never issued, for accounts that already have a substantial amount of debt, and/or for accounts that do not have sufficient funds.

Existing systems for processing stand-in transactions do not allow for transaction service providers to make informed decisions about authorizing a stand-in transaction. For example, in examples where a stand-in transaction is to be processed because the issuer system is unavailable, existing systems fail to provide any mechanism or functionality for the transaction service provider to obtain information about the account to make a decision. Instead, existing systems utilize static limitations that are applied across all accounts and account holders. Static limitations can be easily identified and used to perform fraudulent transactions that are just below the static limitations.

SUMMARY OF THE INVENTION

Accordingly, provided is a system, method, and apparatus for stand-in processing that overcomes some or all of the above-described deficiencies.

According to a non-limiting embodiment, provided is a computer-implemented method for stand-in transaction processing, comprising: receiving a transaction request message corresponding to a transaction, the transaction request message comprising a transaction value and an account identifier; determining, with at least one processor, whether to process the transaction request message as a stand-in transaction based at least partially on the transaction request message; in response to determining to process the transaction request message as a stand-in transaction, determining an account capacity corresponding to the account identifier; determining, with at least one processor, whether to authorize the stand-in transaction based at least partially on the transaction value and the account capacity; and in response to determining to authorize the stand-in transaction, completing the stand-in transaction.

In non-limiting embodiments, determining whether to process the transaction request message as a stand-in transaction comprises communicating an authorization request message based on the transaction request message to an issuer system corresponding to the account identifier and determining to process the transaction request message as a stand-in transaction in response to at least one of the following: receiving a rejection message from the issuer system, determining a time-out from the issuer system, determining that the issuer system is unavailable, or any combination thereof. In non-limiting embodiments, determining whether to process the transaction request message as a stand-in transaction comprises determining if a transaction type associated with the transaction request message is a preapproved transaction type.

In non-limiting embodiments, the computer-implemented method further includes: receiving a first transaction request message corresponding to a first transaction, the transaction request message comprising the account identifier; communicating an authorization request message to an issuer system corresponding to the account identifier; and receiving an authorization response message from the issuer system in response to the authorization request message, the authorization response message comprising the account capacity corresponding to the account identifier. In non-limiting embodiments, the computer-implemented method further includes storing the account capacity in at least one database, wherein determining the account capacity comprises querying the at least one database based at least partially on the account identifier.

In non-limiting embodiments, the computer-implemented method further includes receiving a batch of account capacity data from an issuer system, the batch including the account capacity corresponding to the account identifier, and storing the account capacity in at least one database, wherein determining the account capacity comprises querying the at least one database based at least partially on the account identifier. In non-limiting embodiments, the account capacity comprises an available balance for an account corresponding to the account identifier.

According to another non-limiting embodiment, provided is a system for stand-in transaction processing, comprising at least one transaction processing server including at least one processor, the at least one transaction processing server programmed or configured to: receive a transaction request message corresponding to a transaction, the transaction request message comprising a transaction value and an account identifier; determine whether to process the transaction request message as a stand-in transaction based at least partially on the transaction request message; in response to determining to process the transaction request message as a stand-in transaction, determine an account capacity corresponding to the account identifier; determine whether to authorize the stand-in transaction based at least partially on the transaction value and the account capacity; and in response to determining to authorize the stand-in transaction, complete the stand-in transaction.

In non-limiting embodiments, determining whether to process the transaction request message as a stand-in transaction comprises communicating an authorization request message based on the transaction request message to an issuer system corresponding to the account identifier and determining to process the transaction request message as a stand-in transaction in response to at least one of the following: receiving a rejection message from the issuer system, determining a time-out from the issuer system, determining that the issuer system is unavailable, or any combination thereof. In non-limiting embodiments, determining whether to process the transaction request message as a stand-in transaction comprises determining if a transaction type associated with the transaction request message is a preapproved transaction type.

In non-limiting embodiments, the at least one server is further programmed or configured to: receive a first transaction request message corresponding to a first transaction, the transaction request message comprising the account identifier; communicate an authorization request message to an issuer system corresponding to the account identifier; and receive an authorization response message from the issuer system in response to the authorization request message, the authorization response message comprising the account capacity corresponding to the account identifier. In non-limiting embodiments, the at least one server is further programmed or configured to store the account capacity in at least one database, wherein determining the account capacity comprises querying the at least one database based at least partially on the account identifier. In non-limiting embodiments, the at least one server is further programmed or configured to receive a batch of transaction capacities from an issuer system, the batch including the account capacity corresponding to the account identifier, and store the account capacity in at least one database, wherein determining the account capacity comprises querying the at least one database based at least partially on the account identifier.

According to a further non-limiting embodiment, provided is a computer program product for stand-in transaction processing, comprising at least one computer-readable medium including program instructions that, when executed by at least one processor, cause the at least one processor to: receive a transaction request message corresponding to a transaction, the transaction request message comprising a transaction value and an account identifier; determine whether to process the transaction request message as a stand-in transaction based at least partially on the transaction request message; in response to determining to process the transaction request message as a stand-in transaction, determine an account capacity corresponding to the account identifier; determine whether to authorize the stand-in transaction based at least partially on the transaction value and the account capacity; and in response to determining to authorize the stand-in transaction, complete the stand-in transaction.

In non-limiting embodiments, determining whether to process the transaction request message as a stand-in transaction comprises communicating an authorization request message based on the transaction request message to an issuer system corresponding to the account identifier and determining to process the transaction request message as a stand-in transaction in response to at least one of the following: receiving a rejection message from the issuer system, determining a time-out from the issuer system, determining that the issuer system is unavailable, or any combination thereof. In non-limiting embodiments, determining whether to process the transaction request message as a stand-in transaction comprises determining if a transaction type associated with the transaction request message is a preapproved transaction type.

In non-limiting embodiments, the program instructions further cause the at least one processor to: receive a first transaction request message corresponding to a first transaction, the transaction request message comprising the account identifier; communicate an authorization request message to an issuer system corresponding to the account identifier; and receive an authorization response message from the issuer system in response to the authorization request message, the authorization response message comprising the account capacity corresponding to the account identifier. In non-limiting embodiments, the program instructions further cause the at least one processor to store the account capacity in at least one database, wherein determining the account capacity comprises querying the at least one database based at least partially on the account identifier.

In non-limiting embodiments, the program instructions further cause the at least one processor to receive a batch of transaction capacities from an issuer system, the batch including the account capacity corresponding to the account identifier, and store the account capacity in at least one database, wherein determining the account capacity comprises querying the at least one database based at least partially on the account identifier.

Further preferred and non-limiting embodiments or aspects are set forth in the following numbered clauses.

Clause 1: A computer-implemented method for stand-in transaction processing, comprising: receiving a transaction request message corresponding to a transaction, the transaction request message comprising a transaction value and an account identifier; determining, with at least one processor, whether to process the transaction request message as a stand-in transaction based at least partially on the transaction request message; in response to determining to process the transaction request message as a stand-in transaction, determining an account capacity corresponding to the account identifier; determining, with at least one processor, whether to authorize the stand-in transaction based at least partially on the transaction value and the account capacity; and in response to determining to authorize the stand-in transaction, completing the stand-in transaction.

Clause 2: The computer-implemented method of clause 1, wherein determining whether to process the transaction request message as a stand-in transaction comprises: communicating an authorization request message based on the transaction request message to an issuer system corresponding to the account identifier; and determining to process the transaction request message as a stand-in transaction in response to at least one of the following: receiving a rejection message from the issuer system, determining a time-out from the issuer system, determining that the issuer system is unavailable, or any combination thereof.

Clause 3: The computer-implemented method of clauses 1 or 2, wherein determining whether to process the transaction request message as a stand-in transaction comprises determining if a transaction type associated with the transaction request message is a preapproved transaction type.

Clause 4: The computer-implemented method of any of clauses 1-3, further comprising: receiving a first transaction request message corresponding to a first transaction, the transaction request message comprising the account identifier; communicating an authorization request message to an issuer system corresponding to the account identifier; and receiving an authorization response message from the issuer system in response to the authorization request message, the authorization response message comprising the account capacity corresponding to the account identifier.

Clause 5: The computer-implemented method of any of clauses 1-4, further comprising storing the account capacity in at least one database, wherein determining the account capacity comprises querying the at least one database based at least partially on the account identifier.

Clause 6: The computer-implemented method of any of clauses 1-5, further comprising: receiving a batch of account capacity data from an issuer system, the batch including the account capacity corresponding to the account identifier; and storing the account capacity in at least one database, wherein determining the account capacity comprises querying the at least one database based at least partially on the account identifier.

Clause 7: The computer-implemented method of any of clauses 1-6, wherein the account capacity comprises an available balance for an account corresponding to the account identifier.

Clause 8: A system for stand-in transaction processing, comprising at least one transaction processing server including at least one processor, the at least one transaction processing server programmed or configured to: receive a transaction request message corresponding to a transaction, the transaction request message comprising a transaction value and an account identifier; determine whether to process the transaction request message as a stand-in transaction based at least partially on the transaction request message; in response to determining to process the transaction request message as a stand-in transaction, determine an account capacity corresponding to the account identifier; determine whether to authorize the stand-in transaction based at least partially on the transaction value and the account capacity; and in response to determining to authorize the stand-in transaction, complete the stand-in transaction.

Clause 9: The system of clause 8, wherein determining whether to process the transaction request message as a stand-in transaction comprises: communicating an authorization request message based on the transaction request message to an issuer system corresponding to the account identifier; and determining to process the transaction request message as a stand-in transaction in response to at least one of the following: receiving a rejection message from the issuer system, determining a time-out from the issuer system, determining that the issuer system is unavailable, or any combination thereof.

Clause 10: The system of clauses 8 or 9, wherein determining whether to process the transaction request message as a stand-in transaction comprises determining if a transaction type associated with the transaction request message is a preapproved transaction type.

Clause 11: The system of any of clauses 8-10, wherein the at least one transaction processing server is further programmed or configured to: receive a first transaction request message corresponding to a first transaction, the transaction request message comprising the account identifier; communicate an authorization request message to an issuer system corresponding to the account identifier; and receive an authorization response message from the issuer system in response to the authorization request message, the authorization response message comprising the account capacity corresponding to the account identifier.

Clause 12: The system of any of clauses 8-11, wherein the at least one transaction processing server is further programmed or configured to store the account capacity in at least one database, wherein determining the account capacity comprises querying the at least one database based at least partially on the account identifier.

Clause 13: The system of any of clauses 8-12, wherein the at least one transaction processing server is further programmed or configured to: receive a batch of transaction capacities from an issuer system, the batch including the account capacity corresponding to the account identifier; and store the account capacity in at least one database, wherein determining the account capacity comprises querying the at least one database based at least partially on the account identifier.

Clause 14: A computer program product for stand-in transaction processing, comprising at least one computer-readable medium including program instructions that, when executed by at least one processor, cause the at least one processor to: receive a transaction request message corresponding to a transaction, the transaction request message comprising a transaction value and an account identifier; determine whether to process the transaction request message as a stand-in transaction based at least partially on the transaction request message; in response to determining to process the transaction request message as a stand-in transaction, determine an account capacity corresponding to the account identifier; determine whether to authorize the stand-in transaction based at least partially on the transaction value and the account capacity; and in response to determining to authorize the stand-in transaction, complete the stand-in transaction.

Clause 15: The computer program product of clause 14, wherein determining whether to process the transaction request message as a stand-in transaction comprises: communicating an authorization request message based on the transaction request message to an issuer system corresponding to the account identifier; and determining to process the transaction request message as a stand-in transaction in response to at least one of the following: receiving a rejection message from the issuer system, determining a time-out from the issuer system, determining that the issuer system is unavailable, or any combination thereof.

Clause 16: The computer program product of clauses 14 or 15, wherein determining whether to process the transaction request message as a stand-in transaction comprises determining if a transaction type associated with the transaction request message is a preapproved transaction type.

Clause 17: The computer program product of any of clauses 14-16, wherein the program instructions further cause the at least one processor to: receive a first transaction request message corresponding to a first transaction, the first transaction request message comprising the account identifier; communicate an authorization request message to an issuer system corresponding to the account identifier; and receive an authorization response message from the issuer system in response to the authorization request message, the authorization response message comprising the account capacity corresponding to the account identifier.

Clause 18: The computer program product of any of clauses 14-17, wherein the program instructions further cause the at least one processor to store the account capacity in at least one database, wherein determining the account capacity comprises querying the at least one database based at least partially on the account identifier.

Clause 19: The computer program product of any of clauses 14-18, wherein the program instructions further cause the at least one processor to: receive a batch of transaction capacities from an issuer system, the batch including the account capacity corresponding to the account identifier; and store the account capacity in at least one database, wherein determining the account capacity comprises querying the at least one database based at least partially on the account identifier.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE PREFERRED EMBODIMENTS

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet that includes data. It will be appreciated that numerous other arrangements are possible.

Non-limiting embodiments of the present invention are directed to a system, method, and computer program product for stand-in processing. By obtaining and storing account capacity data for accounts, transaction service providers are able to make informed, automated, and real-time determinations about stand-in processing. Non-limiting embodiments include an improved network infrastructure to provide account capacity data to transaction service providers through new or existing communication channels. For example, in some non-limiting embodiments, an authorization response message may be structurally modified by including one or more additional parameters (e.g., fields or variables) to allow issuer systems to communicate account capacity data during transactions in which the issuer systems are available and online. For example, a 0302 message (structured pursuant to ISO 8583) may be modified to include an account capacity field. This modified message format allows for non-limiting embodiments to be deployed using existing systems without requiring significant modification. In other examples, account capacity data may be communicated via a separate message at regular intervals, in batch files, and/or in other formats. Non-limiting embodiments also improve upon existing technological infrastructures by storing account capacity data in one or more data storage devices in communication with a transaction processing server.

As used herein, the term "transaction service provider" may refer to an entity that receives transaction authorization requests from merchants or other entities and provides guarantees of payment, in some cases through an agreement between the transaction service provider and an issuer institution. The term "transaction service provider" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The portable financial device may include a volatile or a non-volatile memory to store information, such as an account identifier or a name of the account holder.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "stand-in transaction" refers to a transaction in which a transaction service provider, rather than an issuer institution, authorizes a transaction. The term "stand-in processing," as used herein, refers to the processing of a stand-in transaction. A transaction service provider may perform stand-in processing if an issuer system is unavailable for communication, if the issuer institution has designated the transaction service provider to perform stand-in processing for certain types of transactions or during certain time periods, if the issuer system rejects the authorization request, or for any other reason determined by a transaction service provider and/or issuer institution. After performing stand-in processing, a transaction service provider may then settle the transaction with the issuer institution at a later time.

Figure 1:
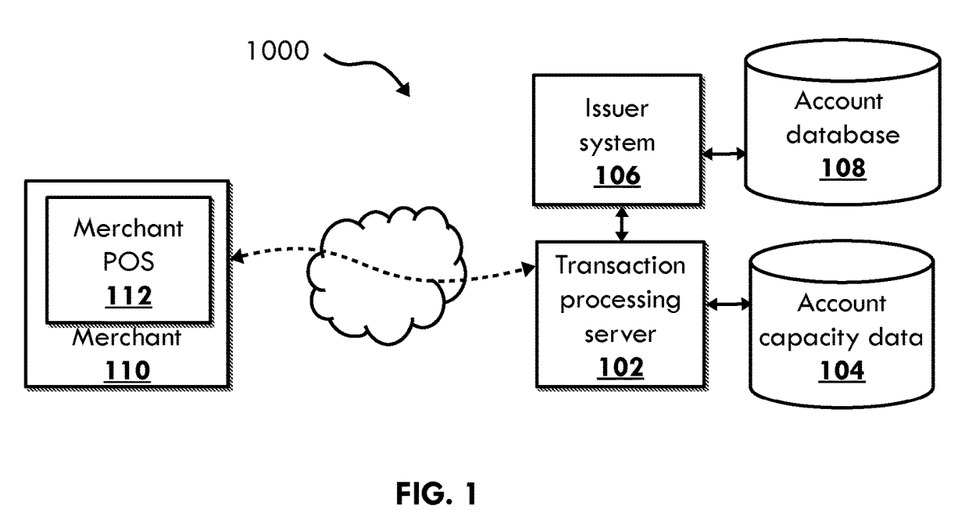
FIG. 1 is a schematic diagram of a system for stand-in processing according to a non-limiting embodiment.

Referring now to FIG. 1, a schematic diagram of a system 1000 for stand-in processing is shown according to a non-limiting embodiment. The system 1000 includes a merchant system 110 having a merchant POS system 112 in communication with a transaction processing server 102. The transaction processing server 102 is in communication with an issuer system 106 and an account capacity database 104. The issuer system 106 is in communication with an account database 108. It will be appreciated that the account capacity database 104 may be part of an existing account database and/or transaction database in communication with the transaction processing server 102 or, in other non-limiting embodiments, may be a separate database. The databases 104, 108 may include any form of data structure and be stored on one or more data storage devices. The account database 108 includes account data including account capacity data. The term "account capacity," as used herein, may refer to an account balance and/or an account limit (e.g., a spending limit or credit limit). The term "account capacity data," as used herein, may refer to one or more parameters or values associated with an account capacity of one or more accounts.

With continued reference to FIG. 1, a user (not shown) initiates a transaction with the merchant POS system 112. The merchant POS system 112 generates a transaction request message and communicates the transaction request message to the transaction processing server 102. In some examples, the transaction request message may be first communicated to a payment gateway or acquirer system (not shown) for initial processing and further communication to the transaction processing server 102. It will be appreciated that various implementations are possible for communicating a transaction request message. The transaction request message may include transaction data associated with the transaction such as, for example, a transaction value, an account identifier, a merchant identifier, a merchant category, a date, a time, and/or the like. Once the transaction request message is received by the transaction processing server 102, the transaction processing server 102 generates an authorization request message and communicates the authorization request message to the issuer system 106. The issuer system 106 processes the authorization request message by determining whether to authorize or reject the transaction. The issuer system 106 then generates an authorization response message and communicates the authorization response message to the transaction processing server 102. The transaction processing server 102 may then complete the transaction in response to determining that the transaction is authorized by the issuer system 106.

Still referring to FIG. 1, in some examples the issuer system 106 may not authorize the transaction. For example, the issuer system 106 may be offline, unavailable, and/or configured to automatically reject the transaction. In other examples, the issuer system 106 may have designated the transaction processing server 102 to respond to certain types of transactions (e.g., based on transaction category, transaction value, transaction time, merchant category, or the like). In such circumstances, the transaction processing server 102 may process the transaction as a stand-in transaction. In response to determining to process the transaction as a stand-in transaction, the transaction processing server 102 may receive account capacity data corresponding to the account identifier used to initiate the transaction. For example, the transaction processing server 102 may query the account capacity database 104 based on at least a portion of the account identifier or a token associated with an account identifier. The transaction processing server 102 may determine whether to authorize the stand-in transaction and complete the stand-in transaction based at least partially on the account capacity data. For example, in some non-limiting embodiments, the transaction processing server 102 may determine to authorize the transaction in response to determining that a transaction value associated with the stand-in transaction satisfies a threshold associated with an account capacity (e.g., that an account balance meets or exceeds the transaction value). It will be appreciated that the threshold may be a value or range of values and may be predetermined or dynamically determined.

In some non-limiting embodiments, and with continued reference to FIG. 1, the transaction processing server 102 may be programmed or configured to perform stand-in processing of a standard stand-in transaction and/or an enhanced stand-in transaction. A "standard stand-in transaction," as used herein, may be a stand-in transaction that is processed based on static thresholds and without using account capacity data. An "enhanced stand-in transaction," as used herein, is a stand-in transaction that is processed based at least partially on account capacity data. In some non-limiting embodiments, the transaction processing server 102 may determine whether to process a transaction as a standard stand-in transaction or an enhanced stand-in transaction based on whether account capacity data is available for the account that initiated the transaction.

Figure 2A:
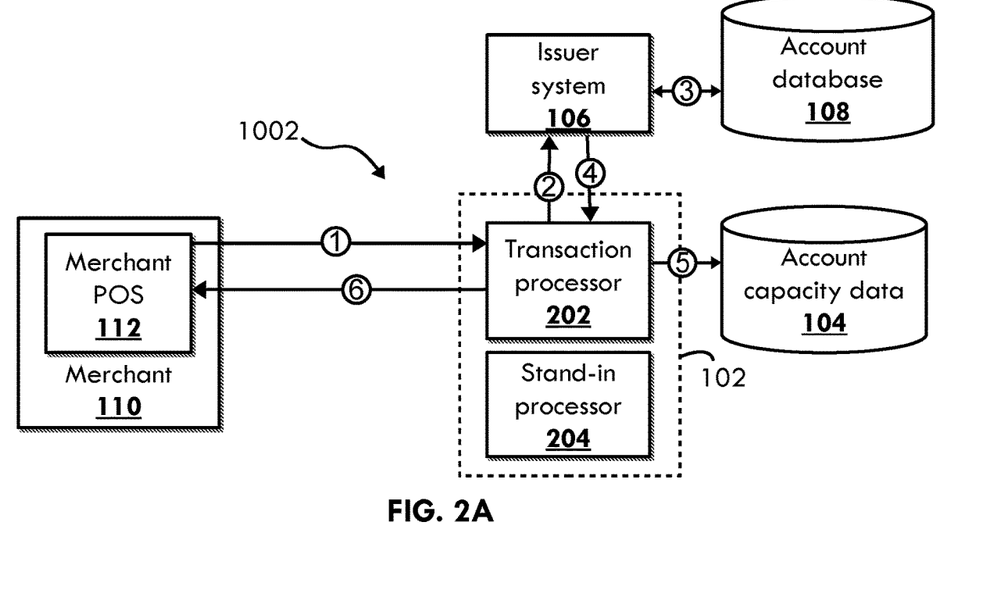
FIGS. 2A and 2B are schematic sequence diagrams of a system for stand-in processing according to a non-limiting embodiment.
Figure 2B:
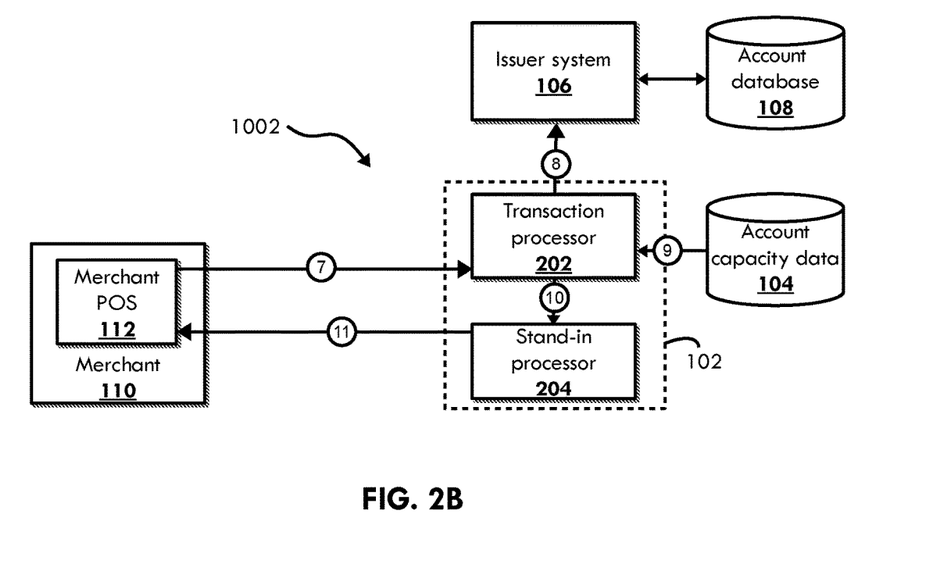

Referring now to FIGS. 2A and 2B, schematic sequence diagrams of a system 1002 for stand-in processing are shown according to a non-limiting embodiment. Referring specifically to FIG. 2A, at step 1 the merchant POS system 112 communicates a transaction request message to the transaction processing server 102. The transaction processing server shown in FIGS. 2A and 2B includes a transaction processor 202 and a stand-in processor 204. The transaction processor 202 and stand-in processor 204 may be one or more of the same or separate processors that form part of the transaction processing server 102. For example, the transaction processing server 102 may include at least one processor that serves as both the transaction processor 202 and the stand-in processor 204. In other examples, at least one processor may serve as the transaction processor 202 and at least one separate processor may serve as the stand-in processor 204. The transaction processor 202 and stand-in processor 204 may be located local or remote to one another. In non-limiting embodiments, the transaction processor 202 is used for processing standard transactions and the stand-in processor 204 is used instead of or in combination with the transaction processor 202 for processing stand-in transactions. It will be appreciated that various other arrangements are possible.

With continued reference to FIG. 2A, at step 2 the transaction processor 202 communicates an authorization request message to the issuer system 106. The issuer system 106, at step 3, retrieves account capacity data (e.g., from account database 108) corresponding to the account used to initiate the transaction. The issuer system 106 may also, at step 3, update the account database 108 to reflect updated account data corresponding to the account used to initiate the transaction. For example, the issuer system 106 may deduct the transaction value from an available account balance for the account. At step 4, the issuer system 106 communicates an authorization response message to the transaction processor 202. The authorization response message may include at least a portion of the account capacity data retrieved from the account database 108. The transaction processor 202, at step 5, extracts the account capacity data from the authorization response message and stores the account capacity data in the account capacity database 104. It will be appreciated that the issuer system 106 may also communicate account capacity data to the transaction processor 202 in separate messages, at regular intervals, as batches of messages for multiple accounts, and/or the like. At step 6, the transaction processor 202 completes the transaction and communicates a confirmation message to the merchant POS system 112.

Referring now to FIG. 2B, the merchant POS system 112 communicates another transaction request message to the transaction processing server 102 at step 7. The transaction processor 202, at step 8, attempts to communicate an authorization request message to the issuer system 106. In this example, the issuer system 106 does not respond to the authorization request message and, at step 9, in response to determining to process the transaction as a stand-in transaction, the transaction processor 202 receives account capacity data corresponding to the account used to initiate the transaction. In some non-limiting embodiments, determining whether to process the transaction as a stand-in transaction may include determining that the issuer system 106 has not responded for a predetermined time period, has communicated a rejection message, is unavailable, or has designated the transaction processing server 102 to conduct stand-in processing for the transaction or type of transaction. Determining whether to process the transaction as a stand-in transaction may additionally or alternatively include, as examples, determining if a transaction type associated with the transaction request message is a preapproved transaction type associated with a stand-in transaction or determining if a transaction time is within a range of times associated with a stand-in transaction.

With continued reference to FIG. 2B, in some examples, determining whether to process the transaction as a stand-in transaction includes determining whether to process the transaction as a standard stand-in transaction or an enhanced stand-in transaction based at least partially on whether account capacity data is available. In response to determining to process the transaction as an enhanced stand-in transaction, the transaction processor 202 may determine whether to authorize the stand-in transaction based at least partially on the account capacity data. In response to determining to authorize the stand-in transaction, the transaction processor 202 communicates transaction data associated with the stand-in transaction to the stand-in processor 204 at step 10. The stand-in processor 204 may then complete the transaction and communicate a confirmation message to the merchant POS system 112 at step 11.

In non-limiting embodiments, one or more issuer institutions may maintain account databases with account capacity data for account holders. Issuer institutions for which the transaction service provider may perform stand-in processing may be identified in a database in communication with the transaction processing server. For example, a flag or other identifier may identify an issuer institution as a participant for stand-in processing. In some examples, the database may also identify issuer institutions that participate in standard stand-in transaction processing and enhanced stand-in transaction processing.

Those issuer institutions that participate in enhanced stand-in transaction processing may provide account capacity data to the transaction processing server (e.g., transaction processing server 102) in various ways. In some non-limiting embodiments, and as explained above, the account capacity data may be communicated embedded within authorization response messages when the issuer system is processing transactions. In other examples, a batch message may be communicated at regular intervals, such as once a day, to the transaction processing server. The batch message may include account capacity data for one or more accounts. The transaction processing server may update its record of account capacity data for each transaction it processes (e.g., by decrementing an account balance by a transaction value), but such account capacity data may not reflect transactions performed by other transaction service providers. In some non-limiting embodiments, the issuer system may communicate account capacity data in response to the account capacity data being updated.

In non-limiting embodiments, one or more rules may be utilized to process stand-in transactions. In some examples, one or more rules may be specified by an issuer institution and/or transaction service provider. For example, a transaction processing server may determine to partially authorize a stand-in transaction, rather than fully authorize the stand-in transaction, if the account capacity data includes an available balance that is less than the transaction value for the stand-in transaction. In such examples, the transaction processing server may generate and communicate a message to the merchant POS system, issuer system, and/or payment gateway to indicate the partial authorization. The message may include an authorized amount such that the stand-in transaction can be modified to include fewer or less expensive items or services.

Figure 3:
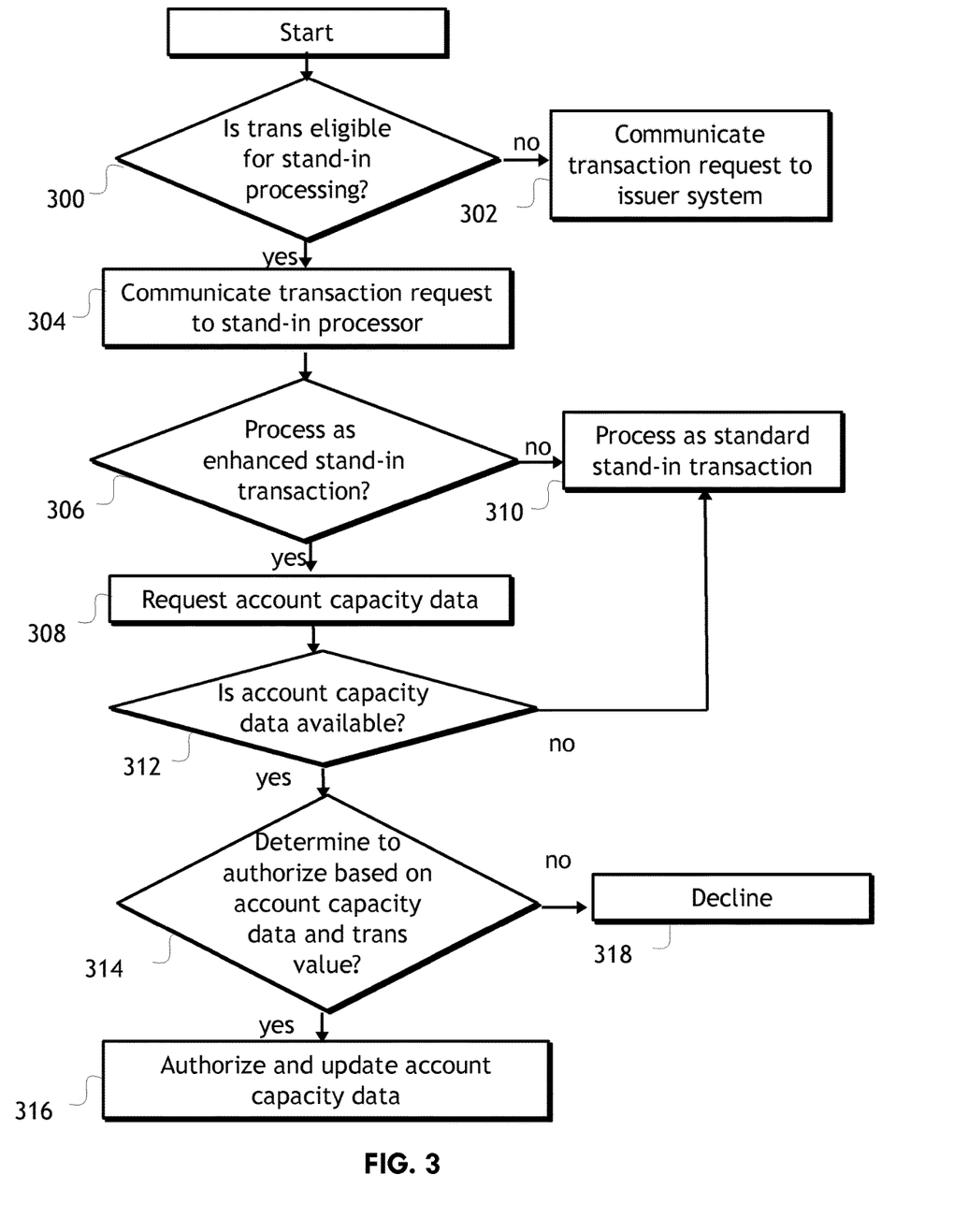
FIG. 3 is a flow diagram for a method of stand-in processing according to a non-limiting embodiment.

Referring now to FIG. 3, a flow diagram of a method for stand-in processing is shown according to a non-limiting embodiment. At a first step 300, a transaction processing server determines whether a requested transaction is eligible to be processed as a stand-in transaction. Step 300 may occur after determining to process the transaction as a stand-in transaction based on, for example, the issuer system being unavailable or a predetermined rule. Determining whether a requested transaction is eligible for stand-in processing may include determining whether the transaction value satisfies a threshold, determining if the account type is qualified, and/or the like. If the transaction is not eligible to be processed as a stand-in transaction at step 300, the method may proceed to step 302 and the transaction request message may be communicated to the issuer system to be acted upon, stored to be communicated to the issuer system at another time, and/or logged. A rejection message may also be generated at step 302. If the transaction is eligible to be processed as a stand-in transaction at step 300, the method may proceed to step 304 where the transaction request message is communicated to a stand-in processor. At step 306, it is determined whether to process the transaction as an enhanced stand-in transaction or a standard stand-in transaction. In some examples, step 306 may include determining if the issuer institution participates in (e.g., is enrolled and/or registered for) enhanced stand-in transaction processing. If the issuer institution does not participate in enhanced stand-in transaction processing, the method may proceed to step 310 where the transaction is processed as a standard stand-in transaction.

With continued reference to FIG. 3, if the issuer institution participates in enhanced stand-in transaction processing, a request is made at step 308 to receive account capacity data. If the issuer system is available and updated account capacity data is available for the account, the updated account capacity data may be retrieved and stored. If the issuer system is not available or does not have updated account capacity data, the method proceeds to step 312 where it is determined whether account capacity data is available for the account (e.g., if the transaction service provider has the account capacity data stored in an account capacity database). If account capacity data is not available for the account, the transaction is processed as a standard stand-in transaction at step 310. If account capacity data is available for the account, the method proceeds to step 314 to determine whether to authorize the transaction based on the transaction value and the account capacity data. As an example, it may be determined if the transaction value is less than an available balance or threshold based on the available balance, or it may be determined if the available balance is equal to or greater than the transaction value or a threshold based on the transaction value. If the transaction value does not satisfy the threshold, the method proceeds to step 318 where the stand-in transaction is declined and/or a message is communicated to the issuer system. If the transaction value does satisfy the threshold, the method proceeds to step 316 and the stand-in transaction is approved and the account capacity data is updated based on the transaction. As an example, an available account balance may be decremented by the transaction value to reflect an updated account balance.

Figure 4:
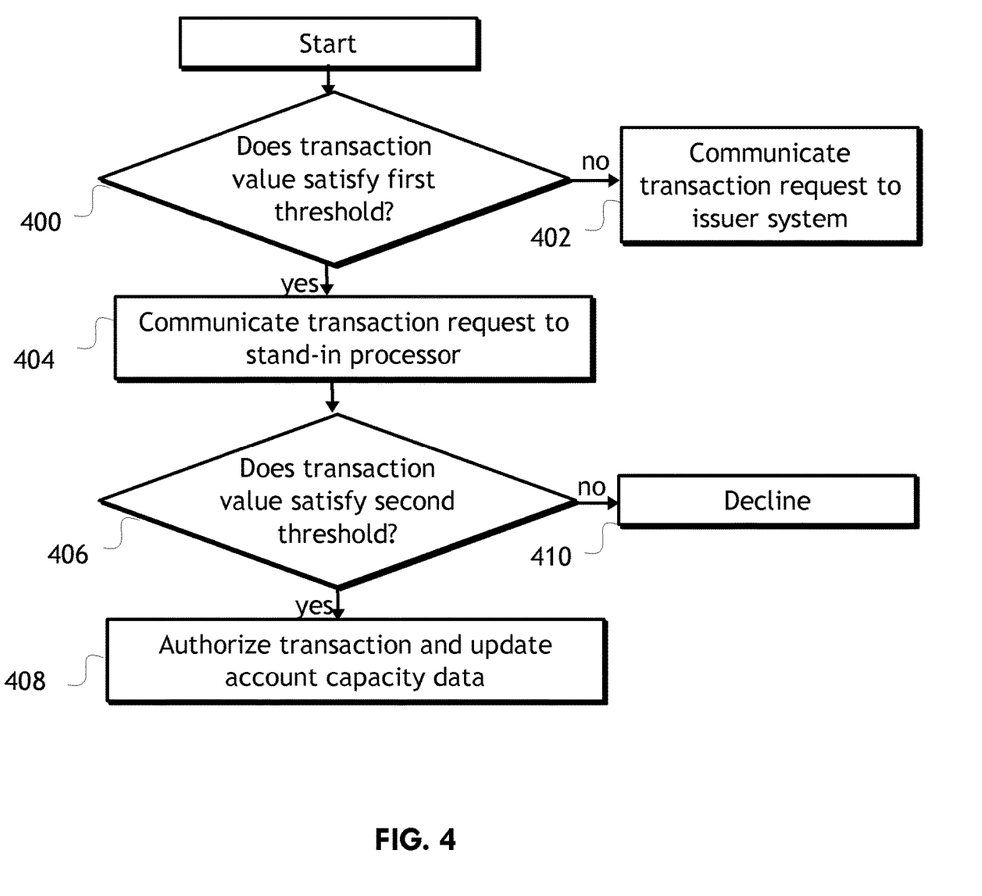
FIG. 4 is a flow diagram for a method of stand-in processing according to a non-limiting embodiment.

Referring now to FIG. 4, a flow diagram of a method for stand-in processing is shown according to a non-limiting embodiment. At a first step 400, it is determined whether the transaction value satisfies a threshold. For example, it may be determined at step 400 whether the transaction value is less than a limit associated with and/or specified by the issuer institution. If the transaction value satisfies the threshold (e.g., if the transaction value is less than a limit), the method proceeds to step 404 where the transaction is communicated to a stand-in processor. If the transaction value does not satisfy the threshold (e.g., if the transaction value is greater than a limit), the method may proceed to step 402 in which the transaction is communicated to the issuer system. At step 406, it is determined if the transaction value satisfies a second threshold based on the account capacity data. For example, it may be determined at step 408 if the transaction value is less than or equal to an available balance. If the transaction value does not satisfy the second threshold, the method proceeds to step 410 where the stand-in transaction is declined and/or communicated to the issuer system. If the transaction value does satisfy the threshold, the method proceeds to step 408 and the stand-in transaction is authorized and the account capacity data is updated based on the transaction. As an example, an available account balance may be decremented by the transaction value to reflect an updated account balance.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for stand-in transaction processing, comprising:
   receiving a first transaction request message corresponding to a first transaction, the first transaction request message comprising an account identifier;
   communicating an authorization request message to an issuer system corresponding to the account identifier;
   generating, with the issuer system, a structurally modified authorization response message by modifying a structured authorization response message to include an account capacity field having account capacity data stored therein;
   receiving the structurally modified authorization response message from the issuer system in response to the authorization request message, the structurally modified authorization response message including the account capacity field comprising the account capacity data representing an account capacity corresponding to the account identifier, the account capacity data comprising at least one of a spending limit and a credit limit corresponding to the account identifier;
   extracting, with at least one processor, the account capacity data from the structurally modified authorization response message;
   storing, with at least one processor, the account capacity data in a database;
   receiving a second transaction request message corresponding to a second transaction, the second transaction request message comprising a transaction value and the account identifier;
   determining, with at least one processor, whether to process the second transaction request message as a stand-in transaction based at least partially on the second transaction request message;
   in response to determining to process the second transaction request message as a stand-in transaction, determining the account capacity corresponding to the account identifier, wherein determining the account capacity comprises querying the database based at least partially on the account identifier;
   determining, with at least one processor, whether to authorize the stand-in transaction based at least partially on the transaction value and the account capacity; and
   in response to determining to authorize the stand-in transaction, completing the stand-in transaction.

2. The computer-implemented method of claim 1, wherein determining whether to process the second transaction request message as a stand-in transaction comprises:
   communicating a second authorization request message based on the second transaction request message to the issuer system corresponding to the account identifier; and
   determining to process the second transaction request message as a stand-in transaction in response to at least one of the following: receiving a rejection message from the issuer system, determining a time-out from the issuer system, determining that the issuer system is unavailable, or any combination thereof.

3. The computer-implemented method of claim 1, wherein determining whether to process the second transaction request message as a stand-in transaction comprises determining if a transaction type associated with the second transaction request message is a preapproved transaction type.

4. The computer-implemented method of claim 1, further comprising:
   receiving a batch of account capacity data from the issuer system, the batch including the account capacity corresponding to the account identifier; and
   storing the account capacity in at least one database, wherein determining the account capacity comprises querying the at least one database based at least partially on the account identifier.

5. The computer-implemented method of claim 1, wherein the account capacity comprises an available balance for an account corresponding to the account identifier.

6. A system for stand-in transaction processing, comprising at least one transaction processing server including at least one processor, the at least one transaction processing server programmed or configured to:
   receive a first transaction request message corresponding to a first transaction, the first transaction request message comprising an account identifier;
   communicate an authorization request message to an issuer system corresponding to the account identifier;
   receive an authorization response message from the issuer system in response to the authorization request message, the authorization response message comprising a structurally modified authorization response message including an account capacity field comprising account capacity data representing an account capacity corresponding to the account identifier, the account capacity data comprising at least one of a spending limit and a credit limit corresponding to the account identifier, wherein the structurally modified authorization response is generated by the issuer system by modifying a structured authorization response message to include an account capacity field having the account capacity data stored therein;
   extract, with at least one processor, the account capacity data from the structurally modified authorization response message;
   store, with at least one processor, the account capacity data in a database;
   receive a second transaction request message corresponding to a second transaction, the second transaction request message comprising a transaction value and the account identifier;
   determine whether to process the second transaction request message as a stand-in transaction based at least partially on the second transaction request message;
   in response to determining to process the second transaction request message as a stand-in transaction, determine the account capacity corresponding to the account identifier by querying the database based at least partially on the account identifier;

determine whether to authorize the stand-in transaction based at least partially on the transaction value and the account capacity; and in response to determining to authorize the stand-in transaction, complete the stand-in transaction.

7. The system of claim 6, wherein determining whether to process the second transaction request message as a stand-in transaction comprises:

communicating a second authorization request message based on the second transaction request message to the issuer system corresponding to the account identifier; and determining to process the second transaction request message as a stand-in transaction in response to at least one of the following: receiving a rejection message from the issuer system, determining a time-out from the issuer system, determining that the issuer system is unavailable, or any combination thereof.

8. The system of claim 6, wherein determining whether to process the second transaction request message as a stand-in transaction comprises determining if a transaction type associated with the second transaction request message is a preapproved transaction type.

9. The system of claim 6, wherein the at least one transaction processing server is further programmed or configured to store the account capacity in at least one database, wherein determining the account capacity comprises querying the at least one database based at least partially on the account identifier.

10. The system of claim 6, wherein the at least one transaction processing server is further programmed or configured to:

receive a batch of transaction capacities from the issuer system, the batch including the account capacity corresponding to the account identifier; and store the account capacity in at least one database, wherein determining the account capacity comprises querying the at least one database based at least partially on the account identifier.

11. The system of claim 6, further comprising the issuer system.

12. A computer program product for stand-in transaction processing, comprising at least one computer-readable medium including program instructions that, when executed by at least one processor, cause the at least one processor to:

receive a first transaction request message corresponding to a first transaction, the first transaction request message comprising an account identifier;

communicate an authorization request message to an issuer system corresponding to the account identifier;

receive an authorization response message from the issuer system in response to the authorization request message, the authorization response message comprising a structurally modified authorization response message including an account capacity field comprising account capacity data representing an account capacity corresponding to the account identifier, the account capacity data comprising at least one of a spending limit and a credit limit corresponding to the account identifier, wherein the structurally modified authorization response is generated by the issuer system by modifying a structured authorization response message to include an account capacity field having the account capacity data stored therein;

extract, with at least one processor, the account capacity data from the structurally modified authorization response message;

store, with at least one processor, the account capacity data in a database;

receive a second transaction request message corresponding to a second transaction, the second transaction request message comprising a transaction value and the account identifier;

determine whether to process the second transaction request message as a stand-in transaction based at least partially on the second transaction request message;

in response to determining to process the second transaction request message as a stand-in transaction, determine an account capacity corresponding to the account identifier by querying the database based at least partially on the account identifier;

determine whether to authorize the stand-in transaction based at least partially on the transaction value and the account capacity; and in response to determining to authorize the stand-in transaction, complete the stand-in transaction.

13. The computer program product of claim 12, wherein determining whether to process the second transaction request message as a stand-in transaction comprises:

communicating a second authorization request message based on the second transaction request message to the issuer system corresponding to the account identifier; and determining to process the second transaction request message as a stand-in transaction in response to at least one of the following: receiving a rejection message from the issuer system, determining a time-out from the issuer system, determining that the issuer system is unavailable, or any combination thereof.

14. The computer program product of claim 12, wherein determining whether to process the second transaction request message as a stand-in transaction comprises determining if a transaction type associated with the second transaction request message is a preapproved transaction type.

15. The computer program product of claim 12, wherein the program instructions further cause the at least one processor to store the account capacity in at least one database, wherein determining the account capacity comprises querying the at least one database based at least partially on the account identifier.

16. The computer program product of claim 12, wherein the program instructions further cause the at least one processor to:

receive a batch of transaction capacities from an issuer system, the batch including the account capacity corresponding to the account identifier; and store the account capacity in at least one database, wherein determining the account capacity comprises querying the at least one database based at least partially on the account identifier.

* * * * *